United States Patent
Kim et al.

(10) Patent No.: US 10,669,361 B2
(45) Date of Patent: Jun. 2, 2020

(54) PREPARATION METHOD OF SUPER ABSORBENT POLYMER

(71) Applicant: LG Chem, Ltd., Seoul (KR)

(72) Inventors: Ki Hyun Kim, Daejeon (KR); Gi Cheul Kim, Daejeon (KR); Won Mun Choi, Daejeon (KR); Won Taeck Lim, Daejeon (KR); Seul Ah Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/083,755

(22) PCT Filed: Dec. 23, 2016

(86) PCT No.: PCT/KR2016/015234
§ 371 (c)(1),
(2) Date: Sep. 10, 2018

(87) PCT Pub. No.: WO2018/074665
PCT Pub. Date: Apr. 26, 2018

(65) Prior Publication Data
US 2019/0085103 A1   Mar. 21, 2019

(30) Foreign Application Priority Data

Oct. 19, 2016 (KR) .................. 10-2016-0135841
Dec. 20, 2016 (KR) .................. 10-2016-0174934

(51) Int. Cl.
| | | |
|---|---|---|
| C08F 20/10 | (2006.01) | |
| C08K 3/22 | (2006.01) | |
| C08K 3/34 | (2006.01) | |
| C08L 33/08 | (2006.01) | |
| C08J 3/12 | (2006.01) | |
| B01J 20/26 | (2006.01) | |
| C08J 3/24 | (2006.01) | |
| C08K 5/51 | (2006.01) | |
| C08F 222/10 | (2006.01) | |

(52) U.S. Cl.
CPC ............. *C08F 20/10* (2013.01); *B01J 20/267* (2013.01); *C08J 3/12* (2013.01); *C08J 3/245* (2013.01); *C08K 3/22* (2013.01); *C08K 3/34* (2013.01); *C08K 5/51* (2013.01); *C08L 33/08* (2013.01); *B01J 2220/68* (2013.01); *C08F 222/102* (2020.02); *C08F 2810/20* (2013.01); *C08J 2333/02* (2013.01); *C08J 2333/08* (2013.01); *C08K 2003/2227* (2013.01); *C08K 2003/2241* (2013.01)

(58) Field of Classification Search
CPC .................. C08F 20/06; B01J 20/267
See application file for complete search history.

(56) References Cited

U.S. PATENT DOCUMENTS

| | | | |
|---|---|---|---|
| 7,638,570 B2 | 12/2009 | Torii et al. | |
| 7,812,082 B2 | 10/2010 | McIntosh et al. | |
| 7,906,585 B2 | 3/2011 | McIntosh et al. | |
| 8,222,477 B2 | 7/2012 | Azad et al. | |
| 8,962,910 B2 | 2/2015 | Azad et al. | |
| 9,309,375 B2 | 4/2016 | Ikeuchi et al. | |
| 9,517,446 B2 | 12/2016 | Won et al. | |
| 9,580,519 B2 | 2/2017 | Nogi et al. | |
| 2006/0204755 A1 | 9/2006 | Torii et al. | |
| 2007/0135554 A1 | 6/2007 | McIntosh et al. | |
| 2008/0021130 A1 | 1/2008 | McIntosh et al. | |
| 2008/0045916 A1 | 2/2008 | Herfert et al. | |
| 2008/0140037 A1* | 6/2008 | Newman ............... | C08K 5/103 604/367 |
| 2009/0281232 A1 | 11/2009 | Ikeuchi et al. | |
| 2010/0100066 A1 | 4/2010 | Azad et al. | |
| 2011/0001087 A1* | 1/2011 | Hillebrecht ............ | A61L 15/18 252/194 |
| 2012/0035294 A1 | 2/2012 | Kim et al. | |
| 2012/0085971 A1 | 4/2012 | Daniel et al. | |
| 2012/0271260 A1 | 10/2012 | Azad et al. | |
| 2014/0114035 A1 | 4/2014 | Nogi et al. | |
| 2015/0087742 A1 | 3/2015 | Won et al. | |
| 2015/0157759 A1 | 6/2015 | Azad et al. | |
| 2015/0210824 A1* | 7/2015 | Wang .................... | C08K 3/346 428/402 |
| 2015/0218341 A1 | 8/2015 | Nakashima et al. | |
| 2015/0225514 A1 | 8/2015 | Kimura et al. | |
| 2016/0096944 A1 | 4/2016 | Wattebled et al. | |
| 2016/0361704 A1 | 12/2016 | Won et al. | |
| 2017/0073478 A1 | 3/2017 | Joo et al. | |

(Continued)

FOREIGN PATENT DOCUMENTS

| | | | |
|---|---|---|---|
| CN | 0398653 B1 | 3/1996 | |
| CN | 100503663 C | 6/2009 | |
| DE | 10013217 A1 * | 9/2001 | ............ A61L 15/18 |

(Continued)

OTHER PUBLICATIONS

Translation of DE 10013217 (2001) (Year: 2001).*
George Odian, "Principles of Polymerization", A Wiley-Interscience Publication, Second Edition, 1981, p. 203.
Ju Eun Kim et al., U.S. Appl. No. 16/084,098, filed Sep. 11, 2018, titled "Super Absorbent Polymer".
Kyu Pal Kim et al., U.S. Appl. No. 16/083,749, filed Sep. 10, 2018, titled "Super Absorbent Polymer".
Kyu Pal Kim et al., U.S. Appl. No. 16/084,111, filed Sep. 11, 2018, titled "Super Absorbent Polymer".
Reinhold Schwalm, "UV Coatings: Basics, Recent Developments and New Applications", Dec. 21, 2006, p. 115.

(Continued)

*Primary Examiner* — Robert C Boyle
(74) *Attorney, Agent, or Firm* — Lerner, David, Littenberg, Krumholz & Mentlik, LLP

(57) ABSTRACT

The present invention relates to a method for superabsorbent polymer that has a crosslinking density gradient increasing from the inside toward the outside, and thus, exhibits excellent properties with simultaneously improved centrifuge retention capacity and absorbency under load.

7 Claims, No Drawings

(56) References Cited

U.S. PATENT DOCUMENTS

| | | |
|---|---|---|
| 2017/0326528 A1 | 11/2017 | Park et al. |
| 2017/0361305 A1 | 12/2017 | Kim et al. |

FOREIGN PATENT DOCUMENTS

| | | | |
|---|---|---|---|
| EP | 3056268 | A1 | 8/2016 |
| JP | H0725935 | A | 1/1995 |
| JP | 2888866 | B2 | 5/1999 |
| JP | 3439234 | B2 | 8/2003 |
| JP | 2003235889 | A | 8/2003 |
| JP | 2004091613 | A | 3/2004 |
| JP | 2008522003 | A | 6/2008 |
| JP | 2009051952 | A | 3/2009 |
| JP | 2009057496 | A | 3/2009 |
| JP | 2009114391 | A | 5/2009 |
| JP | 2013540186 | A | 10/2013 |
| JP | 5367364 | B2 | 12/2013 |
| JP | 5502762 | B2 | 5/2014 |
| JP | 2016056251 | A | 4/2016 |
| JP | 2016056313 | A | 4/2016 |
| KR | 100148487 | B | 12/1998 |
| KR | 20050107415 | A | 11/2005 |
| KR | 20080092341 | A | 10/2008 |
| KR | 20110006771 | A | 1/2011 |
| KR | 20110086057 | A | 7/2011 |
| KR | 20130018350 | A | 2/2013 |
| KR | 20130120400 | A | 11/2013 |
| KR | 101358296 | B1 | 2/2014 |
| KR | 20150050565 | A | 5/2015 |
| KR | 20150056572 | A | 5/2015 |
| KR | 20150116418 | A | 10/2015 |
| KR | 20160004967 | A | 1/2016 |
| KR | 20160010516 | A | 1/2016 |
| KR | 20160016645 | A | 2/2016 |
| KR | 20160016714 | A | 2/2016 |
| KR | 20160068768 | A | 6/2016 |
| KR | 20160091242 | A | 8/2016 |
| WO | 2006062609 | A2 | 6/2006 |
| WO | 2006094907 | A1 | 9/2006 |
| WO | 2012082879 | A1 | 6/2012 |
| WO | 2012082884 | A1 | 6/2012 |
| WO | 2012144595 | A1 | 10/2012 |

OTHER PUBLICATIONS

Search report from International Application No. PCT/KR2016/015234, dated Jul. 17, 2017.
Search report from International Application No. PCT/KR2017/000155, dated Jul. 17, 2017.
Search report from International Application No. PCT/KR2017/000156, dated Jul. 19, 2017.
Search report from International Application No. PCT/KR2017/000157, dated Jul. 19, 2017.
Third Party Observation of PCT/KR2017/000157 dated Feb. 20, 2019.
Extended European Search Report including WQritten Opinion for EP17862793.1 dated Feb. 20, 2019.
Extended European Search Report including Written Opinion for EP16919147.5 dated Feb. 28, 2019.
Extended European Search Report including Written Opinion for EP17863185.9 dated Feb. 28, 2019.
Extended European Search Report including Written Opinion for EP17861873.2 dated Feb. 28, 2019.

* cited by examiner

PREPARATION METHOD OF SUPER ABSORBENT POLYMER

CROSS-REFERENCE TO RELATED APPLICATIONS

This application is a national phase entry under 35 U.S.C. § 371 of International Application No. PCT/KR2016/015234, filed Dec. 23, 2016, which claims priority to Korean Patent Application No. 10-2016-0135841, filed Oct. 19, 2016, and Korean Patent Application No. 10-2016-0174934, filed Dec. 20, 2016, the disclosures of which are incorporated herein by reference.

BACKGROUND OF THE INVENTION

(a) Field of the Invention

The present invention relates to a method for preparing superabsorbent polymer that has a crosslinking density gradient increasing from the inside toward the outside, and thus, has both excellent centrifuge retention capacity and absorbency under load.

(b) Description of the Related Art

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as a disposable diaper and so on, water-holding material for soil, water stop material for civil engineering and architecture, sheets for raising seedling, freshness preservatives in the field of food circulation, fomentation material, etc.

In most cases, such superabsorbent polymer is being widely used in the field of hygienic goods such as a diaper or sanitary pad, etc., and for such use, it is required to exhibit high absorption power to moisture, etc., and the absorbed moisture should not escape even under external pressure, and besides, it should properly maintain the shape even when it absorbs water and the volume is expanded (swollen), thus exhibiting excellent permeability.

However, it is known that centrifuge retention capacity (CRC) which shows the basic absorption power and water retention capacity of the superabsorbent polymer, and absorbency under load (AUL) which shows the property of fully retaining absorbed moisture even under external pressure, are difficult to simultaneously improve. If the overall crosslinking density of the superabsorbent polymer is controlled to be low, although centrifuge retention capacity may relatively increase, the crosslink structure may be loosened and gel strength may decrease, and thus, absorbency under load may be deteriorated. To the contrary, if the crosslinking density is controlled to be high so as to improve absorbency under load, it may be difficult to absorb moisture between the dense crosslink structures, and thus, basic centrifuge retention capacity may be deteriorated.

For the above explained reason, there was a limit to the provision of superabsorbent polymer with simultaneously improved centrifuge retention property and absorbency under load. In order to overcome this, there have been various attempts to improve these properties together by controlling the kind or use amount of an internal crosslinking agent or a surface crosslinking agent, but such attempts have reached the limit.

Therefore, there is a continued demand for the development of superabsorbent polymer exhibiting simultaneously improved centrifuge retention capacity and absorbency under load, and preparation thereof.

SUMMARY OF THE INVENTION

The present invention provides a method for preparing superabsorbent polymer that has a crosslinking density gradient increasing from the inside toward the outside, and thus, has simultaneously improved centrifuge retention capacity and absorbency under load.

Hereinafter, a method for preparing superabsorbent polymer and superabsorbent polymer prepared thereby according to specific embodiments of the invention will be explained.

According to one embodiment of the present invention, a method for preparing superabsorbent polymer comprising the steps of: conducting crosslinking polymerization of water soluble ethylenically unsaturated monomers having acid groups of which at least a part are neutralized, in the presence of an internal crosslinking agent comprising a compound represented by the following Chemical Formula, and inorganic material, to form a hydrogel polymer; drying the hydrogel polymer to form a base resin powder; and additionally crosslinking the surface of the base resin powder in the presence of a surface crosslinking agent to form a surface crosslink layer, is provided:

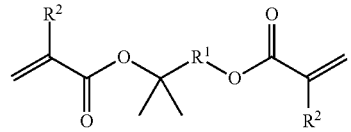

[Chemical Formula 1]

in the Chemical Formula 1, $R^1$ is a divalent organic group derived from C1-10 alkane, and $R^2$ is hydrogen or a methyl group.

The compound represented by the Chemical Formula 1 is a heat-degradable internal crosslinking agent, and it may be degraded by heat. Thus, if water soluble ethylenically unsaturated monomers are subjected to crosslinking polymerization in the presence of the compound of the Chemical Formula 1, and then, introduced into subsequent process, at least a part of the crosslink structure derived from the compound of the Chemical Formula 1 in the crosslinked polymer may be degraded. Thus, the internal crosslinking density in the crosslinked polymer may decrease. To the contrary, the surface of the crosslinked polymer is additionally crosslinked by a surface crosslinking agent, and thus, the external crosslinking density increases. Thus, if crosslinking polymerization is progressed using the compound of the Chemical Formula 1 and subsequent process is conducted, the internal crosslink structure in the crosslinked polymer may be degraded, and the surface of the crosslinked polymer may be additionally crosslinked, and thus, superabsorbent polymer with crosslinking density increasing from the inside toward the outside may be obtained.

Thus prepared superabsorbent polymer may have more decreased internal crosslinking density than the base resin of the existing superabsorbent polymer. Thus, the superabsorbent polymer may exhibit relatively improved centrifuge retention capacity, compared to the existing superabsorbent polymer. And, the superabsorbent polymer may have thicker surface crosslink layer than the existing superabsorbent polymer, because surface crosslinking is progressed before or during the degradation of internal crosslink. Thus, the superabsorbent polymer may exhibit excellent absorbency under load. Therefore, since the crosslinking density of the superabsorbent polymer of one embodiment increases from the inside toward the outside, unlike the existing knowledge that centrifuge retention capacity and absorbency under load are inversely proportional to each other, centrifuge retention capacity and absorbency under load are simultaneously improved, thus exhibiting both excellent properties. Consequently, the superabsorbent polymer of one embodiment can fundamentally solve the problems of the existing superabsorbent polymer and technical requirement of the art, and exhibit more excellent properties.

Hereinafter, a method for preparing superabsorbent polymer according to one embodiment of the invention will be explained in detail.

In the step of forming hydrogel polymer, a monomer mixture comprising water soluble ethylenically unsaturated monomers having acid groups of which at least a part are neutralized, an internal crosslinking agent, and inorganic material is subjected to crosslinking polymerization to form hydrogel polymer.

The water-soluble ethylenically unsaturated monomers may include one or more selected from the group consisting of anionic monomers and salts thereof such as (meth)acrylic acid, maleic acid, maleic anhydride, fumaric acid, crotonic acid, itaconic acid, sorbic acid, vinyl phosphinic acid, vinyl sulfonic acid, allyl sulfonic acid, 2-(meth)acryloylethane sulfonic acid, 2-(meth)acryloyloxy ethane sulfonic acid, 2-(meth)acryloyl propane sulfonic acid, or 2-(meth)acrylamido-2-methyl propane sulfonice acid; non-ionic hydrophilic group containing monomers such as (meth)acrylamide, N-substituted (meth)acrylate, 2-hydroxyethyl (meth)acrylate, 2-hydroxypropyl (meth)acrylate, methoxy polyethylene glycol (meth)acrylate, or polyethylene glycol (meth)acrylate; and amino group containing unsaturated monomers such as (N,N)-dimethylaminoethyl (meth)acrylate, (N,N)-dimethylaminopropyl (meth)acrylamide, and quarternarized products thereof.

Throughout the specification, the term 'water soluble ethylenically unsaturated monomers having acid groups of which at least a part are neutralized' means that the water soluble ethylenically unsaturated monomers include monomers having acidic groups, and at least a part of the acidic groups of the monomers having acidic groups are neutralized.

Particularly, at least a part of the water soluble ethylenically unsaturated monomers may consist of monomers (the salts of anionic monomers) in which the acidic groups included in the anionic monomers are neutralized.

More specifically, as the water soluble ethylenically unsaturated monomers, acrylic acid or salts thereof may be used, and in case acrylic acid is used, at least a part thereof may be neutralized. Due to the use of such monomers, superabsorbent polymer having more excellent properties can be prepared. For example, in case an alkali metal salt of acrylic acid is used as the water soluble ethylenically unsaturated monomers, acrylic acid may be neutralized with a neutralization agent such as caustic soda (NaOH) before use. Here, the neutralization degree of the acrylic acid may be controlled to about 50 to 95 mol %, or about 60 to 85 mol %, and within such a range, superabsorbent polymer with excellent centrifuge retention capacity can be provided without concern of precipitation during neutralization.

In the monomer mixture comprising the water-soluble ethylenically unsaturated monomers, the concentration of the water-soluble ethylenically unsaturated monomers may be controlled to about 20 to about 60 wt %, or about 25 to about 50 wt %, based on the monomer mixture comprising raw materials described below, a polymerization initiator and a solvent, etc., and may be appropriately controlled considering polymerization time and reaction conditions, etc. However, if the concentration of the monomers becomes too low, yield of superabsorbent polymer may decrease, thus causing economical problems, and if the concentration becomes too high, process problems may be generated such as precipitation of a part of the monomers or low grinding efficiency of polymerized hydrogel polymer, etc., and the properties of superabsorbent polymer may be deteriorated.

As the internal crosslinking agent, a compound represented by the Chemical Formula 1 is used so as to introduce an internal crosslink structure that can be degraded by heat into the crosslinked polymer of water soluble ethylenically unsaturated monomers.

In the Chemical Formula 1, $R^1$ is a divalent organic group derived from C1-10 alkane, and $R^2$ is hydrogen or a methyl group, as defined above, Here, the alkane may be linear, branched or cyclic alkane, and the divalent organic group derived from such alkane may be a divalent organic group wherein two hydrogen atoms are removed from one carbon, or a divalent organic group wherein each one hydrogen is removed from different carbon atoms. Specifically, $R^1$ may be methane-1,1-diyl, ethane-1,2-diyl, ethane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl or 2-methylbutane-2,3-diyl.

Among them, $R^1$ in the Chemical Formula 1, may be methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-metylbutane-4,4-diyl, 2-methylbutane-1,3-diyl, 2-methylbutane-1,2-diyl, 2-methylbutane-1,1-diyl or 2-methylbutane-2,3-diyl.

Specifically, $R^1$ in the Chemical Formula 1, may be methane-1,1-diyl, propane-1,3-diyl, or propane-1,2-diyl. More specifically, $R^1$ in the Chemical Formula 1, may be propane-1,3-diyl, or propane-1,2-diyl.

The compound of the Chemical Formula 1 wherein $R^1$ is one of the above listed divalent organic groups may provide an internal crosslink structure of which degradability by heat energy can be easily controlled, and it may not generate by-products or water-soluble components that change the properties of superabsorbent polymer after degradation.

The internal crosslinking agent may further comprise existing internal crosslinking agents known in the technical field to which the present invention pertains, in addition to the compound of the Chemical Formula 1. As the existing internal crosslinking agent, compounds comprising two or more crosslinkable functional groups in the molecule may be used. The existing internal crosslinking agent may comprise a carbon-carbon double bond as the crosslinkable functional group for the smooth crosslinking polymerization of the above explained water soluble ethylenically unsaturated monomers. Specifically, as the existing internal crosslinking agent, one or more selected from the group consisting of polyethyleneglycol diacrylate (PEGDA), glycerin diacrylate, glycerin triacrylate, non-modified or ethoxylated trimethylolpropane, triacrylate (TMPTA), hexanediol diacrylate, allyl (meth)acrylate and triethyleneglycol diacrylate may be used.

The internal crosslinking agent may comprise the compound of the Chemical Formula 1 in the content of 1 to 100 wt % or 50 to 100 wt %, based on the total weight of the internal crosslinking agent, and may comprise the remaining amount of the existing internal crosslinking agents, so as to have crosslinking density gradient of the aimed level. However, in order to provide superabsorbent polymer with simultaneously improved centrifuge retention capacity and absorbency under load, as the internal crosslinking agent, the compound represented by the Chemical Formula 1 may be used.

That is, the internal crosslinking agent may comprise the compound of the Chemical Formula 1 in the content of 100 wt %.

And, the internal crosslinking agent may be used in the content of 0.01 to 5 parts by weight, 0.01 to 3 parts by weight, 0.1 to 3 parts by weight, or 0.2 to 1.5 parts by weight, based on 100 parts by weight of the water soluble ethylenically unsaturated monomers. Here, the content of the water soluble ethylenically unsaturated monomers is based on the weight of the water soluble ethylenically unsaturated monomers before the acidic groups of the monomers having acidic groups included in the water soluble ethylenically unsaturated monomers are neutralized. For example, in case the water soluble ethylenically unsaturated monomers include acrylic acid, the content of the internal crosslinking agent may be controlled on the basis of the weight of the monomer before acrylic acid is neutralized.

And, the internal crosslinking agent may be used in an appropriate concentration, based on the monomer mixture.

The internal crosslinking agent may be used within the above explained ranges to provide superabsorbent polymer that has a suitable crosslinking density gradient, and thus, has simultaneously improved centrifuge retention capacity and absorbency under load.

The inorganic material may be added during the crosslinking polymerization process of the water soluble ethylenically unsaturated monomers to provide superabsorbent polymer exhibiting excellent absorption properties.

As the inorganic material, for example, montmorillonite, saponite, nontronite, laponite, beidelite, hectorite, sauconite, stevensite, vermiculite, volkonskoite, magadite, medmontite, kenyaite, kaolin mineral, serpentine mineral, mica mineral, chlorite mineral, sepolite, palygorskite, bauxite silica, alumina, titania or a mixture thereof may be used.

Among them, laponite can effectively improve centrifuge retention capacity and absorbency under load.

The organic material may be added in the amount of about 0.001 to 1.0 wt %, based on the monomer mixture, to realize excellent absorption properties.

And, the monomer mixture may further comprise a polymerization initiator commonly used in the preparation of superabsorbent polymer.

Specifically, the polymerization initiator may be appropriately selected according to polymerization methods, a thermal polymerization initiator may be used when a thermal polymerization method is used, a photopolymerization initiator may be used when a photopolymerization method is used, and both thermal polymerization initiator and photopolymerization initiator may be used when a hybrid polymerization method (method using both heat and light) is used. However, even in the case of photopolymerization, since a certain amount of heat is generated by UV irradiation, etc., and heat is generated to some degree according to the progression of an exothermic polymerization reaction, a thermal polymerization initiator may be additionally included.

The photopolymerization initiator is not limited in terms of its construction, as long as it is a compound capable of forming a radical by light such as UV.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. Specific example of the acyl phosphine may include diphenyl(2,4,6-trimethylbenzoyl)phosphine oxide, phenylbis(2,4,6-trimethylbenzoyl)phosphine oxide, ethyl (2,4,6-trimethylbenzoyl)phenylphosphinate, etc. More various photopolymerization initiators are described in Reinhold Schwalm, "UV Coatings: Basics, Recent Developments and New Application (Elsevier 2007)", page 115, and are not limited to the above described examples.

The photopolymerization initiator may be added in the concentration of about 0.0001 to about 2.0 wt %, based on the monomer composition. If the concentration of the photopolymerization initiator is too low, polymerization speed may become slow, and if the concentration of the polymerization initiator is too high, the molecular weight of the superabsorbent polymer may become small and the properties may become non-uniform.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl)propane]dihydrochloride, 4,4-azobis-(4-cyanovalericacid), etc. More various thermal initiators are described in "Principle of Polymerization (Wiley, 1981)", Odian, page 203, and are not limited to the above described examples.

The thermal polymerization initiator may be included in the concentration of about 0.001 to about 2.0 wt %, based on the monomer composition. If the concentration of the thermal polymerization initiator is too low, additional thermal polymerization may hardly occur, and thus, the effect obtained by the addition of the thermal polymerization initiator may be insignificant, and if the concentration of the thermal polymerization initiator is too high, the molecular weight of the superabsorbent polymer may become small, and the properties may become non-uniform.

The monomer mixture may further comprise additives such as a thickener, a plasticizer, a preservation stabilizer, an antioxidant, etc., as necessary.

The above explained raw materials such as water soluble ethylenically unsaturated monomers, an internal crosslinking agent, inorganic material, a polymerization initiator and additives may be prepared in the form of a solution dissolved in a solvent.

Here, the solvent that can be used is not limited in terms of its construction as long as it can dissolve or disperse the above explained components, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount excluding the above-explained components, based on the total amount of the monomer mixture.

Meanwhile, a method of forming hydrogel polymer by the thermal polymerization, photopolymerization or hybrid polymerization of the monomer composition is not specifically limited in terms of its construction, as long as it is a commonly used polymerization method.

Specifically, the polymerization method is largely classified into thermal polymerization and photopolymerization according to energy source. Commonly, thermal polymerization may be progressed in a reactor equipped with a stirring axis such as a kneader, and, in case thermal polymerization is progressed, it may be progressed at a temperature of about 80° C. or more and less than about 110° C. so that the compound represented by the Chemical Formula 1 may not be degraded by heat. A means to achieve the polymerization temperature of the above explained range is not specifically limited, and a heating medium may be supplied to the reactor or a heat source may be directly supplied to heat. The kinds of the heating medium that can be used may include temperature-raised fluid such as steam, hot air, hot oil, etc., but are not limited thereto, and may be appropriately selected considering the means of the heating medium, temperature rise speed and target temperature to be increased. Meanwhile, the heat source directly supplied may include electric heating, gas heating, etc., but is not limited thereto.

Meanwhile, photopolymerization may be progressed in a reactor equipped with a movable conveyer belt, but the above explained polymerization methods are no more than examples, and the present invention is not limited thereto.

For example, in case thermal polymerization is progressed by supplying a heating medium into a reactor equipped with a stirring axis such as a kneader as explained above or heating the reactor, hydrogel polymer discharged to the outlet of the reactor may be obtained. The hydrogel polymer may be obtained in the size of a few centimeters to a few millimeters according to the shape of the stirring axis equipped in the reactor. Specifically, the size of obtained hydrogel polymer may vary according to the concentration of the introduced monomer mixture and the introduction speed, etc.

And, in case photopolymerization is progressed in a reactor equipped with a movable conveyer belt as explained above, the obtained hydrogel polymer may be in the form of a sheet having the width of the belt. Here, the thickness of the polymer sheet may vary according to the concentration of the introduced monomer mixture and the introduction speed, but, commonly, a monomer mixture is preferably fed such that polymer in the form of a sheet having a thickness of about 0.5 cm to about 10 cm may be obtained. In case a monomer mixture is fed such that the thickness of sheet-shaped polymer may be too thin, production efficiency may be low, and if the thickness of the sheet-shaped polymer is greater than 10 cm, due to the too thick thickness, a polymerization reaction may not uniformly occur throughout the whole thickness.

The polymerization time of the monomer mixture is not specifically limited, and it may be controlled to about 30 seconds to 60 minutes.

Here, the moisture content of hydrogel polymer obtained by such a method may be about 30 to about 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry. At this time, the drying condition is set up such that the temperature is raised from room temperature to about 180° C. and then maintained at 180° C., and the total drying time is 20 minutes including a temperature raising step of 5 minutes.

In the step of forming base resin powder, the hydrogel polymer obtained through the step of forming hydrogel polymer is dried to provide base resin powder.

In the step of forming base resin powder, a coarse grinding process may be included before drying the hydrogel polymer so as to increase drying efficiency.

Here, grinders that can be used in the coarse grinding is not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but is not limited thereto.

Through the coarse grinding step, the particle diameter of the hydrogel polymer may be controlled to about 0.1 to about 10 mm. Grinding to a particle diameter of less than 0.1 mm would not be technically easy due to the high moisture content of the hydrogel polymer, and may generate agglomeration between the ground particles. Meanwhile, if grinding to a particle diameter greater than 10 mm, the effect of increasing the efficiency of the subsequent drying step may be insignificant.

The hydrogel polymer coarsely ground as explained above, or hydrogel polymer immediately after polymerization that does not pass through the coarse grinding step is dried, and the drying temperature may be about 20° C. to about 250° C. If the drying temperature is less than about 20° C., a drying time may too lengthen, and the properties of the finally prepared superabsorbent polymer may be deteriorated, and if the drying temperature is greater than about 250° C., only the surface of hydrogel polymer may be dried, thus generating fine powder in the subsequent grinding process, and the properties of the finally prepared superabsorbent polymer may be deteriorated. Preferably, the drying may be progressed at a temperature of about 40 to 200° C., more preferably at 110 to 200° C.

Particularly, if the drying temperature of the hydrogel polymer is about 110° C. to about 200° C., at least a part of the crosslink structure derived from the compound represented by the Chemical Formula 1 may be degraded by heat. As the result, the internal crosslinking density of the crosslinked polymer may decrease in the drying step. Such crosslinked polymer with decreased internal crosslinking density may provide superabsorbent polymer with remarkably improved centrifuge retention capacity, compared to the crosslinked polymer of which internal crosslinking density has not decreased.

Meanwhile, the drying may be progressed for 20 minutes to 120 minutes considering the process efficiency, etc. For example, the hydrogel polymer may be dried for about 20 minutes to 100 minutes or about 30 minutes to about 50 minutes, so that the internal crosslink structure may be sufficiently degraded.

And, the drying method is not limited in terms of the construction as long as it can be commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 0.1 to about 10 wt %.

The step of forming base resin powder may further comprise a step of grinding the dried polymer obtained through the drying step.

The particle diameter of the polymer powder obtained after the grinding step may be 150 µm to 850 µm. As a grinder for grinding to such a particle diameter, specifically, a pin mill, a hammer mill, a screw mill, a roll mill, a disc mill, or a jog mill, etc. may be used, but the grinder is not limited thereto.

And, the step of forming base resin powder may further comprise a step of sieving the ground polymer obtained through the grinding step. That is, in the step of forming base resin powder, the hydrogel polymer may be dried, ground and sieved to provide base resin powder.

After the grinding step, a step of sieving the polymer powder according to the particle diameter may be conducted so as to manage the properties of the finally productized superabsorbent polymer. It is appropriate that base rein power and superabsorbent polymer obtained therefrom are prepared and provide with particle diameters of about 150 to 850 µm, through the processes of grinding and sieving, etc. More specifically, at least about 95% of the base resin powder and superabsorbent polymer obtained therefrom may have particle diameters of about 150 to 850 µm, and less than about 3 wt % thereof may be fine powder with particle diameters of less than about 150 µm As explained, since the particle diameter distributions of the base resin powder and superabsorbent polymer are controlled within preferable ranges, the finally prepared superabsorbent polymer may exhibit excellent absorption properties. Thus, in the sieving step, polymer with particle diameters of about 150 to about 850 µm may be sieved, and only the polymer powders having such particle diameters may be subjected to surface crosslinking and productized.

Meanwhile, after forming the base resin powder, in the presence of a surface crosslinking agent, the surface of the base resin powder may be additionally crosslinked to form a surface crosslink layer, thereby preparing superabsorbent polymer.

As the surface crosslinking agent, any surface crosslinking agents used for the preparation of superabsorbent polymer before may be used without specific limitations. Specific examples thereof may include one or more polyols selected from the group consisting of ethyleneglycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; one or more carbonate-based compounds selected from the group consisting of ethylene carbonate and propylene carbonate; epoxy compounds such as ethyleneglycol diglycidylether, etc.; oxazoline compounds such as oxazolidinone, etc.; polyamine compounds; oxazoline compounds; mono-, di-, or polyoxazolidinone compounds; or cyclic urea compounds, etc.

Such a surface crosslinking agent may be used in the content of about 0.01 to 3 parts by weight, based on 100 parts by weight of the base resin powder. By controlling the content range of the surface crosslinking agent within the above explained range, superabsorbent polymer exhibiting excellent absorption properties may be provided.

And, in the surface crosslinking process, in addition to the surface crosslinking agent, one or more inorganic materials selected from the group consisting of silica, clay, alumina, silica-alumina composite, titania, zinc oxide and aluminum sulfate may be further added to conduct a surface crosslinking reaction. The inorganic material may be used in the form of powder or liquid, and particularly, in the form of alumina powder, silica-alumina powder, titania powder, or nano silica solution. And, the inorganic material may be used in the content of about 0.001 to about 2 parts by weight, based on 100 parts by weight of the base resin powder.

And, in the surface crosslinking process, instead of or in addition to the inorganic material, multivalent metal cation may be added to progress surface crosslinking, thereby optimizing the surface crosslink structure of superabsorbent polymer. It is predicted that such metal cation may form chelate with the carboxy group (COOH) of superabsorbent polymer, thus further reducing the crosslinking distance.

And, the method of adding the surface crosslinking agent to base resin powder is not limited in terms of its construction. For example, a surface crosslinking agent and base resin powder may be put in a reactor and mixed, a surface crosslinking agent may be sprayed to base resin powder, or base resin powder and a surface crosslinking agent may be continuously fed to a continuously operated mixed and mixed.

When the surface crosslinking agent is added, water and methanol may be mixed together and added. In case water and methanol are added, the surface crosslinking agent may be uniformly dispersed in the base resin power. Here, the contents of water and methanol added may be appropriately controlled so as to induce uniform dispersion of the surface crosslinking agent, preventing the agglomeration of the base resin powder, and optimizing the surface penetration depth of the crosslinking agent.

By heating the base resin powder to which the surface crosslinking agent is added beyond a specific temperature, a surface crosslinking reaction may be achieved. In such a surface crosslinking step, an internal crosslink degradation reaction may be achieved simultaneously with the surface crosslinking reaction. Thus, in the surface crosslinking step, at least a part of the crosslink structure derived from the compound of the Chemical Formula 1 in the base resin powder may be heat degraded, and thus, internal crosslinking density may decrease. And, due to the above reactions, superabsorbent polymer with a crosslinking density gradient increasing from the inside toward the outside may be prepared.

Particularly, in order to prepare superabsorbent polymer with simultaneously improved centrifuge retention capacity and absorbency under load, the surface crosslinking reaction may be conducted at a temperature of about 110 to 200° C.

More specifically, the surface crosslinking conditions may include a maximum reaction temperature of about 160° C. or more, or about 180 to 200° C., and a maintenance time at the maximum reaction temperature of about 20 minutes or more, or about 20 minutes to 2 hours. And, a time during which a temperature is increased from the temperature at the beginning of the reaction, for example, about 110° C. or more, or about 160 to 170° C., to the above maximum reaction temperature, may be controlled to about 10 minutes or more, or about 10 minutes to 1 hour, and it was confirmed that superabsorbent polymer with simultaneously excellent centrifuge retention capacity and absorbency under load may be prepared by satisfying the above explained surface crosslinking process conditions.

A temperature rise means for the surface crosslinking reaction is not specifically limited. A heating medium may be supplied, or a heat source may be directly supplied to heat. Here, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

The superabsorbent polymer obtained according to the above explained preparation method may exhibit very excellent properties with simultaneously improved centrifuge retention capacity and absorbency under load, and can exhibit excellent properties so as to be appropriately used for hygienic goods such as diapers, etc.

Specifically, the superabsorbent polymer obtained according to the above explained preparation method may have centrifuge retention capacity (CRC) to a saline solution of about 30 to 50 g/g, and absorbency under load (AUL) of 0.7 psi to a saline solution of about 15 to 30 g/g/. More specifically, the superabsorbent polymer obtained according to the above explained preparation method may have centrifuge retention capacity (CRC) to a saline solution of about 35 to 50 g/g, 38 to 50 g/g, 39 to 50 g/g, 40 to 50 g/g, 43 to 50 g/g or 45 to 50 g/g, and absorbency under load (AUL) of 0.7 psi to a saline solution of about 18 to 30 g/g, 20 to 30 g/g, 22 to 30 g/g, 24 to 30 g/g, 25 to 30 g/g or 26 to 30 g/g.

The centrifuge retention capacity (CRC) to a saline solution may be measured according to EDANA method NWSP 241.0.R2, and the absorbency under load (AUL) of 0.7 psi to a saline solution may be measured according to EDANA method NWSP 242.0.R2. For more specific measuring methods of CRC and AUL, experimental examples described below may be referred to.

In the method for preparing superabsorbent polymer according to the above embodiment, by appropriately controlling the kind and content of an internal crosslinking agent, and temperature and/or time conditions of the process after polymerization (drying or surface crosslinking process), superabsorbent polymer with a crosslinking density gradient of the aimed level may be provided. Since such superabsorbent polymer has a crosslinking density gradient increasing from the inside toward the outside, it may exhibit excellent centrifuge retention capacity, as well as further improved absorbency under load. Thus, such superabsorbent polymer may be preferably applied for various hygienic goods such as diapers to exhibit generally very excellent properties.

According to the preparation method of one embodiment, unlike the existing knowledge that centrifuge retention capacity and absorbency under load are inversely proportional to each other, superabsorbent polymer exhibiting excellent properties with simultaneously improved centrifuge retention capacity and absorbency under load can be provided. Thus, using the preparation method, the problems of the existing superabsorbent polymer and technical requirement of the art can be fundamentally solved, and various hygienic goods exhibiting more excellent properties can be provided.

DETAILED DESCRIPTION OF THE EMBODIMENTS

Hereinafter, the actions and the effects of the invention will be explained in detail through the specific examples. However, these examples are presented only as the illustrations of the invention, and the scope of the right of the invention is not limited thereby.

Example 1: Preparation of Superabsorbent Polymer

Into a glass reactor, 100 g of acrylic acid, 0.6 g of 4-methylpentane-1,4-diyl diacrylate, 0.008 g of Irgacure TPO (diphenyl(2,4,6-trimethylbenzoyl)phosphine oxide), 0.18 g of laponite and 55 g of water were put. And, to the glass reactor, 123.5 g of 32 wt % caustic soda solution was slowly added dropwise and mixed.

When adding the caustic soda solution dropwise, the temperature of the mixed solution increased by neutralization heat, thus waited until the mixed solution was cooled. When the temperature of the mixed solution was cooled to about 45° C., 0.2 g of sodium persulfate was added to the mixed solution to prepare a monomer mixture.

On a conveyer belt with a width of 10 cm and a length of 2 m, rotating at the velocity of 50 cm/min, the monomer mixture was fed at 500-2000 mL/min. And, simultaneously with the feeding of the monomer mixture, UV was irradiated at the intensity of 10 mW/cm$^2$ to progress a polymerization reaction for 60 seconds.

And, the polymer obtained through the polymerization reaction was passed through a hole with a diameter of 10 mm to prepare as crumb using a meat chopper. Subsequently, the crumb was uniformly dried by flowing hot air of 185° C. from the lower part to the upper part for 20 minutes using an oven capable of transferring air volume upward and downward, and flowing it again from the upper part to the lower part for 20 minutes. The dried crumb was ground with a grinder, and then, sieved to obtain base resin with a size of 150 to 850 μm.

To 100 g of the above prepared base resin powder, a mixed solution of 3.2 g of deionized water, 4.0 g of methanol, 0.088 g of ethylene carbonate, and 0.01 g of silica (product name: REOLOSIL DM30S, manufacturing company: Tokuyama Corporation) was added, and mixed for 1 minute, and then, surface crosslinking was conducted at 185° C. for 90 minutes.

And, the obtained product was ground and sieved to obtain superabsorbent polymer with a particle diameter of 150 to 850 μm.

Example 2: Preparation of Superabsorbent Polymer

Superabsorbent polymer was prepared by the same method as Example 1, except that 0.18 g of hectorite was used instead of 0.18 g of laponite in Example 1.

Example 3: Preparation of Superabsorbent Polymer

Superabsorbent polymer was prepared by the same method as Example 1, except that 0.6 g of 2-methylpentane-2,4-diyl diacrylate was used instead of 0.6 g of 4-methylpentane-1,4-diyldiacrylate in Example 1.

Example 4: Preparation of Superabsorbent Polymer

Superabsorbent polymer was prepared by the same method as Example 1, except that 0.6 g of 2-methylpropane-1,2-diyldiacrylate was used instead of 0.6 g of 4-methylpentane-1,4-diyldiacrylate in Example 1.

Example 5: Preparation of Superabsorbent Polymer

Superabsorbent polymer was prepared by the same method as Example 1, except that 0.6 g of 2-methyl-butane- 2,4-diyl diacrylate was used instead of 0.6 g of 4-methylpentane-1,4-diyl diacrylate in Example 1.

Example 6: Preparation of Superabsorbent Polymer

Superabsorbent polymer was prepared by the same method as Example 1, except that 0.3 g of Aerosil® 200 was used instead of 0.18 g of laponite in Example 1.

Comparative Example 1: Preparation of Superabsorbent Polymer

Superabsorbent polymer was prepared by the same method as Example 1, except that 0.4 g of polyethyleneglycol diacrylate (PEGDA, weight average molecular weight 598 g/mol) was used instead of 0.6 g of 4-methylpentane-1,4-diyl diacrylate in Example 1.

For reference, in case the content of polyethyleneglycol diacrylate was adjusted to 0.6 g as Example 1, superabsorbent polymer with very inferior centrifuge retention capacity was prepared, and thus, the content of polyethyleneglycol diacrylate was adjusted to 0.4 g, unlike Example 1, to prepare superabsorbent polymer.

Comparative Example 2: Preparation of Superabsorbent Polymer

Superabsorbent polymer was prepared by the same method as Example 4, except that laponite was not introduced.

Comparative Example 3: Preparation of Superabsorbent Polymer

Superabsorbent polymer was prepared by the same method as Example 5, except that laponite was not introduced.

Experimental Example: Evaluation of the Properties of Superabsorbent Polymer

The properties of the superabsorbent polymers prepared according to Examples and Comparative Examples were evaluated as follows, and shown in the following Table 1.

(1) Centrifuge Retention Capacity (CRC)

The centrifuge retention capacity (CRC) of the superabsorbent polymer to a saline solution was measured according to EDANA method NWSP 241.0.R2.

Specifically, among the superabsorbent polymer of which centrifuge retention capacity is to be measured, a sample with the particle diameter of 150 to 850 μm, which passes through a US standard 20 mesh screen, and remains on a US standard 100 mesh screen, was prepared.

And, $W_0$ (g, about 0.2 g) of the sample having a particle diameter of 150 to 850 μm were uniformly put in an envelope made of non-woven fabric, and the envelope was sealed. And, the envelope was soaked in a 0.9 wt % sodium chloride aqueous solution (saline solution) at room temperature. After 30 minutes, the envelope was drained at 250 G for 3 minutes using a centrifuge, and then, the mass $W_2$ (g) of the envelope was measured. And, after the same operation using an empty envelope without a sample, the mass $W_1$ (g) at that time was measured.

Using the obtained weights, CRC (g/g) was calculated according to the following Calculation Formula 1.

CRC (g/g)={[$W_2$ (g)−$W_1$ (g)]/$W_0$ (g)}−1   [Calculation Formula 1]

In the Calculation Formula, $W_0$ (g) is the initial weight of the sample having a particle diameter of 150 to 850 μm(g), $W_1$ (g) the weight of an empty envelope made of non-woven fabric, measured after the empty envelope without a sample was soaked in a saline solution at room temperature for 30 minutes, and then, drained using a centrifuge at 250 G for 3 minutes, and $W_2$ (g) is the weight of an envelope made of nonwoven fabric including the sample, measured after the envelope made of nonwoven fabric including the sample was soaked in a saline solution at room temperature for 30 minutes, and then, drained using a centrifuge at 250 G for 3 minutes.

(2) Absorbency Under Load (AUL)

The absorbency under load (AUL) of 0.7 psi of the superabsorbent polymer to a saline solution was measured according to EDANA method NWSP 242.0.R2.

Specifically, a 400 mesh screen made of stainless was installed on the bottom of a plastic cylinder with an inner diameter of 25 mm. Under the conditions of room temperature and relative humidity of 50%, $W_0$ (g, 0.16 g) of superabsorbent polymer of which absorbency under load is to be measured were uniformly scattered on the screen. Subsequently, a piston that can uniformly give a load of 4.8 kPa (0.7 psi) was added on the superabsorbent polymer. Here, as the piston, a piston having an outer diameter slightly smaller than 25 mm was used such that there was no gap with the inner wall of the cylinder, and the movement upward and downward was not hindered. At this time, the weight $W_3$ (g) of the apparatus was measured.

Subsequently, on the inner side of a petri dish with a diameter of 150 mm, a glass filter with a diameter of 90 mm and a thickness of 5 mm was positioned, and a 0.90 wt % sodium chloride aqueous solution (saline solution) was poured on the petri dish. Here, the saline solution was poured until the water level of the saline solution became horizontal to the upper side of the glass filter. And, one filter paper with a diameter of 90 mm was put thereon.

Subsequently, the above prepared apparatus was mounted on the filter paper so that the superabsorbent polymer in the apparatus was swollen by the saline solution under load. After 1 hour, the weight $W_4$ (g) of the apparatus including swollen superabsorbent polymer was measured.

Using the measured weights, absorbency under load was calculated according to the following Calculation Formula 2.

AUL (g/g)=[$W_4$ (g)−$W_3$ (g)]/$W_0$ (g)   [Calculation Formula 2]

In the Calculation Formula 2, $W_0$ (g) is the initial weight (g) of superabsorbent polymer, $W_3$ (g) is the sum of the weight of superabsorbent polymer and the weight of the apparatus capable of giving load to the superabsorbent polymer, and $W_4$ (g) is the sum of the weight of superabsorbent polymer and the weight of the apparatus capable of giving load to the superabsorbent polymer, after a saline solution is absorbed in the superabsorbent polymer under load (0.7 psi) for 1 hour.

표 1

|  | CRC [g/g] | AUL [g/g] |
|---|---|---|
| Example 1 | 46.3 | 26.1 |
| Example 2 | 39.6 | 25.7 |
| Example 3 | 44.7 | 25.3 |
| Example 4 | 42.3 | 24.3 |

TABLE 1-continued

|  | CRC [g/g] | AUL [g/g] |
|---|---|---|
| Example 5 | 38.2 | 26.4 |
| Example 6 | 45.9 | 24.6 |
| Comparative Example 1 | 35.4 | 24.1 |
| Comparative Example 2 | 39.1 | 23.5 |
| Comparative Example 3 | 35.3 | 26.0 |

The absorbencies under load (AUL) of 0.9 psi of the superabsorbent polymers prepared in Examples 1, 3 and 5 to a saline solution were additionally measured. The absorbency under load of 0.9 psi of superabsorbent polymer to a saline solution was measured by the same method as the measurement method of absorbency under load of 0.7 psi as explained above, except using a piston capable of uniformly giving a load of 6.3 kPa (0.9 PSI). As the result of measurement, the absorbency under load of 0.9 psi of superabsorbent polymer prepared in Example 1 to a saline solution was 19.4 g/g, the absorbency under load of 0.9 psi of superabsorbent polymer prepared in Example 3 to a saline solution was 18.7 g/g, and the absorbency under load of 0.9 psi of superabsorbent polymer prepared in Example 5 to a saline solution was 25.5 g/g.

Referring to Table 1, it is confirmed that the superabsorbent polymers of Examples 1 to 6 wherein superabsorbent polymer was prepared in the presence of a heat-degradable internal crosslinking agent and inorganic material, have both excellent centrifuge retention capacity and absorbency under load.

To the contrary, the superabsorbent polymer of Comparative Example 1 wherein a heat-degradable internal crosslinking agent was not used, and the superabsorbent polymers of Comparative Example 2 and 4 wherein a heat-degradable internal crosslinking agent and inorganic material were not used together, failed to exhibit both excellent centrifuge retention capacity and absorbency under load.

Meanwhile, comparing Examples 1 and 2, it is confirmed that if laponite is used among the inorganic materials, more excellent centrifuge retention capacity and absorbency under load can be realized.

Meanwhile, comparing Examples 1, 3, 4 and 5, it is confirmed that among the compounds represented by the Chemical Formula 1, the compound wherein $R^1$ is methane-1,1-diyl(Example 4); propane-1,3-diyl(Example 1); or propane-1,2-diyl(Example 3) can realize excellent centrifuge retention capacity and absorbency under load, and among them, the compound wherein $R^1$ is propane-1,3-diyl(Example 1); or propane-1,2-diyl(Example 3) can realize more excellent centrifuge retention capacity and absorbency under load.

What is claimed is:

1. A method for preparing superabsorbent polymer comprising the steps of:
conducting crosslinking polymerization in an aqueous solution of water soluble ethylenically unsaturated monomers having acid groups of which at least a part are neutralized, in the presence of an internal crosslinking agent comprising a compound represented by the following Chemical Formula 1, and inorganic material, to form a hydrogel polymer;
drying the hydrogel polymer to form a base resin powder; and
additionally crosslinking the surface of the base resin powder in the presence of a surface crosslinking agent to form a surface crosslink layer,
wherein the inorganic material is laponite:

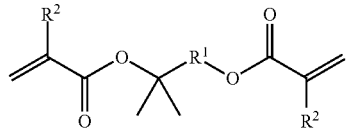

[Chemical Formula 1]

in the Chemical Formula 1, $R^1$ is a divalent organic group derived from C1-10 alkane, and $R^2$ is hydrogen or a methyl group,
wherein the internal crosslinking agent comprises a compound of the Chemical Formula 1 wherein $R^1$ is methane-1,1-diyl, propane-1,3-diyl, propane-1,2-diyl, propane-1,1-diyl, n-butane-1,4-diyl, n-butane-1,3-diyl, n-butane-1,2-diyl, n-butane-1,1-diyl, 2-methylpropane-1,3-diyl, 2-methylpropane-1,2-diyl, 2-methylpropane-1,1-diyl, 2-methylbutane-1,4-diyl, 2-methylbutane-2,4-diyl, 2-methylbutane-3,4-diyl, 2-methylbutane-4,4-diyl, 2-methylbutane-1,3-diyl, 2-methylbutane-1,2-diyl, 2-methylbutane-1,1-diyl or 2-methylbutane-2,3-diyl, and
wherein centrifuge retention capacity (CRC) to a saline solution is 39 to 50 g/g.

2. The method for preparing superabsorbent polymer according to claim 1, wherein the internal crosslinking agent comprises a compound of the Chemical Formula 1, in the content of 1 to 100 wt %, based on the total weight of the internal crosslinking agent.

3. The method for preparing superabsorbent polymer according to claim 1, wherein the internal crosslinking agent is used in the content of 0.01 to 5 parts by weight, based on 100 parts by weight of the water soluble ethylenically unsaturated monomers.

4. The method for preparing superabsorbent polymer according to claim 1, wherein the hydrogel polymer is dried at 110 to 200° C.

5. The method for preparing superabsorbent polymer according to claim 1, wherein the hydrogel polymer is dried for 20 to 100 minutes.

6. The method for preparing superabsorbent polymer according to claim 1, wherein the surface of the base resin powder is additionally crosslinked at 110 to 200° C.

7. The method for preparing superabsorbent polymer according to claim 1, wherein absorbency under load (AUL) of 0.7 psi to a saline solution is 15 to 30 g/g.

* * * * *